3,400,159
NOVEL MUSK-LIKE SUBSTITUTED
ACENAPHTHENES AND PROCESS
Ernst T. Theimer, Rumson, and Jack H. Blumenthal, Oakhurst, N.J., assignors to International Flavors & Fragrances Inc., New York, N.Y., a corporation of New York
No Drawing. Filed Nov. 14, 1963, Ser. No. 323,593
10 Claims. (Cl. 260—592)

ABSTRACT OF THE DISCLOSURE

Novel acenaphthenes and tetrahydronaphthalenes having a musk-like odor and intermediates for producing same, including 7 - acetyl - 2a,3,4,5 - tetrahydro - 1,1,5,5-tetramethylacenaphthene, and process for producing such materials.

---

This invention relates to the new and useful compound 17 - acetyl - 2a,3,4,5 - tetrahydro - 1,1,5,5 - tetramethyl acenaphthene, processes for its production and intermediates produced.

It is an object of this invention to provide a novel compound with musk-like odor.

It is a further object of this invention to provide simple and efficient methods for the production of the compounds mentioned.

We have discovered a novel compound 7 - acetyl-2a,3,4,5 - tetrahydro - 1,1,5,5 - tetramethyl acenaphthene having a powerful mask-like odor and suitable for use in perfume compositions and the like.

The process for making said acenaphthene is a four step process. The known compound 1,1 - dimethyl-1,2,3,4 - tetrahydronaphthalene is initially halogenated at the 4 position to provide a novel 1,1 - dimethyl - 4-halo - 1,2,3,4 - tetrahydronaphthalene, for example, 1,1-dimethyl - 4 - chloro - 1,2,3,4 - tetrahydronaphthalene. The halo compound is then reacted with a methallyl magnesium halide to produce the new intermediate 1,1-dimethyl - 4 - methallyl - 1,2,3,4 - tetrahydronaphthalene which is then cyclized to form 2a,3,4,5 - tetrahydro-1,1,5,5 - tetramethyl acenaphthene. This novel compound is acylated at the 7 position to produce the final product.

In the first step of the reaction, 1,1 - dimethyl - 1,2,3,4-tetrahydronaphthalene is halogenated at the 4 position by a halogenating agent which will substitute a halogen for a hydrogen on an allylic carbon atom. Many such halogenating agents are known including, for example sulfuryl chloride, N - halosuccinimide, N - halophthalimide, t - butylhypochlorite and a molecular halogen itself. All of these halogenating agents function by a free radical mechanism in which the radical is generated by light, a peroxide or other known means. The reaction then may be termed free radical halogenation.

It is preferred to produce a 1,1 - dimethyl - 4 - halo-1,2,3,4 - tetrahydronaphthalene in which the halogen atom is chlorine or bromine and of these of chloro compound is preferred since it is readily produced in good yields from easily available halogenating agents.

For the production of the chloro compound, tert-butyl hypochlorite is now preferred. The reaction is carried out with or without a reaction inert organic solvent. Such solvent if used should be one devoid of hydrogen atoms which are replaceable under the conditions of the reaction. The preferred solvents are aromatic compounds such as benzene or fully halogenated solvents such as carbon tetrachloride. It is most convenient to operate without a solvent and to use a large excess of dimethyl-1,2,3,4 - tetrahydronaphthalene. This compound thus functions as both reactant and solvent.

The time and temperature of the reaction are not critical, since some product is produced as soon as the reactants are brought together. For practical yields, however, we prefer to effect reaction at from about 25° C. to about 60° C. for a period of from about 1 to 6 hours. The most practical operating conditions consistent with obtaining high yields are from 30° C. to 40° C. for about two hours.

The product, which may be isolated in any convenient manner, may be represented by the formula

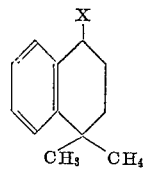

wherein X is chlorine or bromine.

In the next step of the process of this invention, the 1,1 - dimethyl - halo - 1,2,3,4 - tetrahydronaphthalene is reacted with methallyl magnesium halide, e.g., a Grignard reagent. The preferred Grignard reagent is the chloride. Reaction is best effected by adding the halo-1,2,3,4 - tetrahydronaphthalene in a reaction solvent such as diethyl ether or tetrahydofuran and maintaining the mixture at reflux for from about one to about four hours. Although it is not essential, I prefer to utilize an excess of Grignard reagent to insure as complete a reaction as possible of the more expensive halo - 1,2,3,4 - tetrahydronaphthalene.

The compound thus produced may be represented by the formula

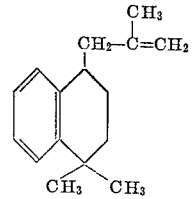

It may be isolated in any convenient manner.

Cyclization of 1,1 - dimethyl - 4 - methallyl - 1,2,3,4-tetrahydronaphthalene to form 2a,3,4,5 - tetrahydro-1,1,5,5 - tetramethyl acenaphthene may be effected using any of a number of known cyclizing agents such as sulfuric or polyphosphoric acid. The preferred reagent is 80–95% sulfuric acid.

In a preferred embodiment the product of the foregoing reaction is added to 88% sulfuric acid at a rate consistent with maintaining the reaction mixture at from about 5° C. to about 15° C. with external cooling if necessary. The time of reaction is not critical, but best yields are obtained if the reaction mixture is stirred for an additional one to four hours after all the reactant is added.

The amount of cyclizing agent is not critical. However, as a practical matter, we prefer to use at least equal weights of sulfuric acid and starting compound. As much as 100% by weight excess of concentrated sulfuric acid based on the weight of the starting compound may be utilized with good results.

The product may be isolated in any convenient manner. It has the formula

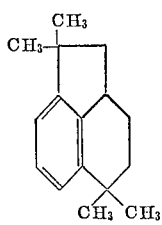

In the final step of the process, the product from the foregoing reaction is acetylated by reaction with acetyl chloride or acetic anhydride under Friedel-Crafts conditions. Reaction takes place in a reaction inert organic solvent suitably a hydrocarbon, nitro-hydrocarbon or halohydrocarbon such as 2-nitropropane, nitrobenzene, carbon tetrachloride or ethylene dichloride. Carbon disulfide may also be employed. We prefer to take up the organic reactants in the selected solvents and to add the Friedel-Crafts catalyst such as aluminum chloride or boron trifluoride in small amounts while maintaining the temperature at from about −5° C. to about 10° C. The time of reaction will depend upon the amounts of reactants. After all of the catalyst has been added the mixture is stirred an additional one to four hours to complete the reaction.

A slight excess of acetylating agent may be employed to insure as complete a reaction as possible although this is not essential. Generally, approximately an equimolar portion of catalyst based on the amount of acenaphthene present will be used.

The compound produced may be isolated by any of the methods utilized with Friedel-Crafts type reactions. It may be represented by the formula

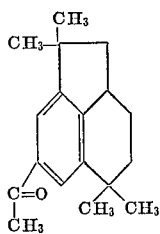

The product of this invention may be employed in the same manner as other musk-like compounds alone or in admixture with other ingredients. It may be used for example in perfumes, lotions, powders, soaps and the like containing one or more odorants or flavoring substances.

The following are examples of the manner in which we now prefer to practice our invention. It is understood that the invention is not to be considered as restricted thereto except as indicated in the appended claims.

EXAMPLE 1

In a 500 ml. 3-neck flask equipped with a thermometer, stirrer and an addition funnel (protected from light) are placed 265 grams of dimethyl-1,2,3,4-tetrahydronaphthalene. The flask is illuminated by means of a 60 watt bulb held about one centimeter from the flask. The dimethyl-1,2,3,4-tetrahydronaphthalene is warmed to 40° C. and with good stirring 52 grams of tertiary butyl hypochlorite added in small amounts over a period of one hour. The reaction is slightly exothermic and the temperature is maintained between 30° C. and 40° C. by means of a water bath. After the addition is complete, the reaction mixture is stirred for an additional 45 minutes. The excess dimethyl-1,2,3,4-tetrahydronaphthalene is removed by fractionation to a head temperature of 73° C. and a pot temperature of 96° C. at 1 mm. of mercury to leave the desired product as a residue. The product is crude chloro dimethyl-1,2,3,4-tetrahydronaphthalene.

EXAMPLE 2

In a thoroughly dry nitrogen purged two-liter 3-neck flask equipped with a stirrer, thermometer, reflux condenser and an addition funnel is placed 30 grams of magnesium turning, 300 grams of ether and 7 grams of methyllyl chloride. After the reaction is initiated, the flask is cooled to 3° C. and a solution of 93 grams methyllyl chloride in 470 grams of ether added over a four hour period at 0° C. to 5° C. The reaction mixture is stirred at this temperature for another seven hours and then stirred overnight at room temperature. The Grignard reagent is transferred to another flask under nitrogen (excess magnesium removed) and a solution of 76 grams of the crude chlorodimethyl-1,2,3,4-tetrahydronaphthalene (obtained as in Example 1) in 500 ml. of ether added over a period of one hour under reflux. The reaction mixture is refluxed for another two hours, cooled and poured into a stirred solution of 750 ml. of water, 500 grams of crushed ice and 200 grams of ammonium chloride. The aqueous layer is separated and extracted with 250 ml. of ether. The combined ether layers are washed with a 10% ammonium chloride solution and the solvent stripped off. The residue is distilled at 2 mm., and 61 grams of the 1,1-dimethyl-4-methalkyl-1,2,3,4-tetrahydronaphthalene is obtained; $N_D^{20}$ 1.5275, boiling point 106° C. at 0.4 mm. of mercury.

EXAMPLE 3

With good stirring, 59 grams of the product of the previous example is added at 8° C. to 10° C. over a period of four hours to 200 grams of 88% sulfuric acid. The reaction is stirred for an additional hour at this temperature and then poured into a mixture of 100 grams of water and 100 grams of ice. The organic layer is separated and the water layer extracted with 75 ml. of benzene. The combined organic layers are washed successively with 20% salt solution, 10% sodium carbonate solution and 20% salt solution. The solvent is stripped off and the residue distilled to yield 44 grams of 2a,3,4,5-tetrahydro-1,1,5,5-tetramethyl acenaphthene; $N_D^{20}$ 1.5316, boiling point 116° C. at 4.8 mm. of mercury.

EXAMPLE 4

To a solution of 54 grams of 2-nitropropane, 13.5 grams acetyl chloride and 27 grams of the product of the previous example is added at 0° C. to 5° C. with good stirring small amounts of aluminum chloride every 15 minutes over a period of two hours. (Total amount of aluminum chloride used is 20 grams.) The reaction mixture is stirred for an additional two hours at 8° C. to 10° C. then poured into a cold solution of 100 cc. of water and 27 grams of concentrated hydrochloric acid. The mixture is stirred for 15 minutes and separated. The organic layer is washed twice with concentrated hydrochloric acid, then successively with salt solution, 10% sodium carbonate and salt solution. The solvent is stripped off and the residue distilled, at 141° at one mm. of mercury. The distillate is recrystallized from aqueous ethanol. The recrystallized ketone melted at 117–118° and had a strong musk-like odor.

What is claimed is:
1. 7-acetyl-2a,3,4,5-tetrahydro-1,1,5,5-tetramethyl acenaphthene.
2. 2a,3,4,5-tetrahydro-1,1,5,5-tetramethyl acenaphthene.
3. 1,1-dimethyl-4-methyallyl-1,2,3,4-tetrahydronaphthalene.

4. A process which comprises reacting 1,1-dimethyl-1,2,3,4 - tetrahydronaphthalene with N-halosuccinimide, N-halophthalimide, t-butyl hypochlorite, sulfuryl chloride, or a molecular halogen as a halogenating agent operating by a free radical mechanism, reacting the resulting product with a methallyl magnesium halide selected from the group consisting of methallyl magnesium bromide and chloride, cyclizing the resulting product with sulfuric or polyphosphoric acid to product 2a,3,4,5-tetrahydro-1,1,5,5-tetramethyl acenaphthene, and acylating the thus produced product with acetyl chloride under Friedel-Crafts conditions to produce 7-acetyl-2a-3,4,5-tetrahydro-1,1,5,5-tetramethyl acenaphthene.

5. A process which comprises reacting 1,1-dimethyl 1,2,3,4 - tetrahydronaphthalene with N-halosuccinimide, N-halophthalimide, t-butyl hypochlorite, sulfuryl chloride, or a molecular halogen as a halogenating agent operating by a free radical mechanism to produce a compound having the formula

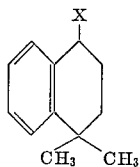

wherein X is selected from the group consisting of chlorine and bromine.

6. A process which comprises reacting 1,1-dimethyl-1,2,3,4-tetrahydronaphthalene with tert-butyl hypochlorite to produce 1,1 - dimethyl - 4-chloro-1,2,3,4-tetrahydronaphthalene.

7. A process which comprises reacting a compound selected from the group consisting of compounds having the formula

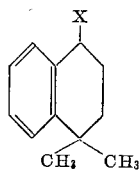

wherein X is selected from the group consisting of chlorine and bromine with a methallyl magnesium halide selected from the group consisting of methallyl magnesium bromide and chloride to produce 1,1-dimethyl-4-methallyl-1,2,3,4-tetrahydronaphthalene.

8. A process which comprises reacting 1,1-dimethyl-4-methallyl-1,2,3,4 - tetrahydronaphthalene with a sulfuric or polyphosphoric acid cyclizing agent to produce 2a,3,4,5-tetrahydro-1,1,5,5-tetramethyl acenaphthene.

9. A process which comprises reacting 1,1-dimethyl-4-methallyl-1,2,3,4-tetrahydronaphthalene with from about 80% to 95% sulfuric acid to form 2a,3,4,5-tetrahydro-1,1,5,5-tetramethylacenaphthene.

10. A process which comprises reacting 2a,3,4,5-tetrahydro-1,1,5,5-tetramethyl acenaphthene with acetyl chloride in the presence of a Friedel-Crafts catalyst to produce 7-acetyl-2a,3,4,5-tetrahydro-1,1,5,5-tetramethyl acenaphthene.

References Cited

Rapoport et al.: Jr. Am. Chem. Soc. 78, 3788–3792 (1956).

Barnes et al.: Chemical Abstracts 46, 7528f (1952).

Winstein et al.: Chemical Abstracts 51, 2678c (1957).

DANIEL D. HORWITZ, *Primary Examiner.*